US012659669B2

(12) United States Patent
Kim

(10) Patent No.: US 12,659,669 B2
(45) Date of Patent: Jun. 16, 2026

(54) LINEAR SPEAKER

(71) Applicant: DAEHONG TECHNEW CO., LTD, Seoul (KR)

(72) Inventor: Dong Kwan Kim, Gyeonggi-do (KR)

(73) Assignee: DAEHONG TECHNEW CO., LTD, Seoul (KR)

( * ) Notice: Subject to any disclaimer, the term of this patent is extended or adjusted under 35 U.S.C. 154(b) by 161 days.

(21) Appl. No.: 18/569,319

(22) PCT Filed: Jan. 28, 2022

(86) PCT No.: PCT/KR2022/001547
§ 371 (c)(1),
(2) Date: Dec. 12, 2023

(87) PCT Pub. No.: WO2022/265179
PCT Pub. Date: Dec. 22, 2022

(65) Prior Publication Data
US 2024/0284107 A1 Aug. 22, 2024

(30) Foreign Application Priority Data
Jun. 17, 2021 (KR) ........................ 10-2021-0078670

(51) Int. Cl.

| | |
|---|---|
| ***H04R 9/02*** | (2006.01) |
| ***H04R 9/04*** | (2006.01) |
| ***H04R 9/06*** | (2006.01) |
| *H04R 7/04* | (2006.01) |

(52) U.S. Cl.
CPC ............. *H04R 9/025* (2013.01); *H04R 9/047* (2013.01); *H04R 9/06* (2013.01); *H04R 7/04* (2013.01)

(58) Field of Classification Search
CPC .......... H04R 9/025; H04R 9/047; H04R 9/06; H04R 7/04
See application file for complete search history.

(56) References Cited

U.S. PATENT DOCUMENTS

| | | | | |
|---|---|---|---|---|
| 2002/0172392 | A1* | 11/2002 | Iwasa | H04R 9/025 381/420 |
| 2007/0076915 | A1 | 4/2007 | Shin et al. | |
| 2008/0205686 | A1* | 8/2008 | Tagami | H04R 9/025 381/398 |
| 2013/0272563 | A1 | 10/2013 | Boyd | |
| 2020/0275190 | A1* | 8/2020 | Cho | H04R 9/045 |

(Continued)

FOREIGN PATENT DOCUMENTS

| | | | |
|---|---|---|---|
| EP | 3758390 | A1 | 12/2020 |
| JP | 2016-116177 | A | 6/2016 |
| KR | 10-2015-0057230 | A | 5/2015 |

(Continued)

OTHER PUBLICATIONS

Office Action from corresponding European Patent Application No. 2285111.2 dated Apr. 14, 2025.

(Continued)

*Primary Examiner* — Joseph Saunders, Jr.
(74) *Attorney, Agent, or Firm* — Christensen, Fonder, Dardi, Busse; Andrew H. Auderieth; Peter S. Dardi

(57) ABSTRACT

The present disclosure relates to a linear speaker, and is to provide a linear speaker having a magnetic circuit optimized for a driving unit having a diaphragm extending in one direction.

3 Claims, 4 Drawing Sheets

(56) References Cited

U.S. PATENT DOCUMENTS

| | | | | |
|---|---|---|---|---|
| 2021/0029466 | A1 | 1/2021 | Kim | |
| 2021/0297783 | A1* | 9/2021 | Leem | H04R 9/025 |

FOREIGN PATENT DOCUMENTS

| | | | | |
|---|---|---|---|---|
| KR | 20150057230 | A * | 5/2015 | H04R 9/06 |
| KR | 10-2015-0112644 | A | 10/2015 | |
| KR | 10-2019-0139496 | A | 12/2019 | |
| KR | 10-2079372 | B1 | 4/2020 | |

OTHER PUBLICATIONS

International Search Report from corresponding Patent Application No. PCT/KR2022/001547 dated Aug. 8, 2022.
Office Action from corresponding Korean Patent Application No. 10-2021-0078670 dated Sep. 12, 2022.

* cited by examiner

LINEAR SPEAKER

CROSS REFERENCE TO RELATED APPLICATIONS

The present application is a National Stage filing of PCT Application No. PCT/KR2022/001547 filed Jan. 28, 2022, entitled "Linear Speaker," which claims the benefit of priority based on Korean Patent Application No. 10-2021-0078670 filed on Jun. 17, 2021.

TECHNICAL FIELD

The present disclosure relates to a linear speaker, and particularly to a linear speaker having a magnetic circuit optimized for a driving unit having a diaphragm extending in one direction.

BACKGROUND ART

A linear speaker has a large difference in structure and performance in amplifying sound compared to a typical point source speaker, and the use of a line array speaker may be more advantageous than the use of a point source speaker as the space becomes wider.

A linear speaker is a group of non-directional radiating speaker elements, specifically, a speaker device having a linear diaphragm extending in one direction. The linear speaker may be very effective at radiating sound over a long distance.

The linear speaker has a magnetic circuit of a driving unit formed differently from a conventional speaker having a disk-shaped diaphragm, and a magnetic circuit optimized for this is required.

DISCLOSURE OF THE INVENTION

Technical Goals

The present disclosure relates to a linear speaker, and is to provide a linear speaker having a magnetic circuit optimized for a driving unit having a diaphragm extending in one direction.

Technical objects to be achieved by the present disclosure are not limited to the technical objects mentioned above, and other technical objects not mentioned will be clearly understood by those skilled in the art from the description below.

Technical Solutions

A linear speaker of the present disclosure may include a diaphragm vibrating in a vertical direction and extending in a first direction perpendicular to the vertical direction;

a coil substrate having an upper end coupled to a lower surface of the diaphragm and extending in the first direction;

a coil unit printed as a spiral wire on one side surface of the coil substrate parallel to the vertical direction and the first direction;

a first magnet which is magnetically polarized in the vertical direction and located spaced apart from the coil substrate in a second direction perpendicular to the vertical direction and the first direction at a location facing the one side surface of the coil substrate;

a second magnet which is magnetically polarized in the vertical direction and located spaced apart from the coil substrate in the second direction at a location facing the other side surface of the coil substrate; and a plurality of yokes coupled to upper ends and lower ends of the first magnet and the second magnet, respectively.

Advantageous Effects

For a linear speaker of the present disclosure, the magnetic circuit of the driving unit that drives the diaphragm extending in one direction is optimized, so that the linear speaker may be driven efficiently and stably.

The linear speaker of the present disclosure may minimize the configuration and size of the device by radiating the sound source itself as a line-shaped wavefront, and may effectively propagate sound in a wide space.

BEST MODE FOR CARRYING OUT THE INVENTION

Figure 1:
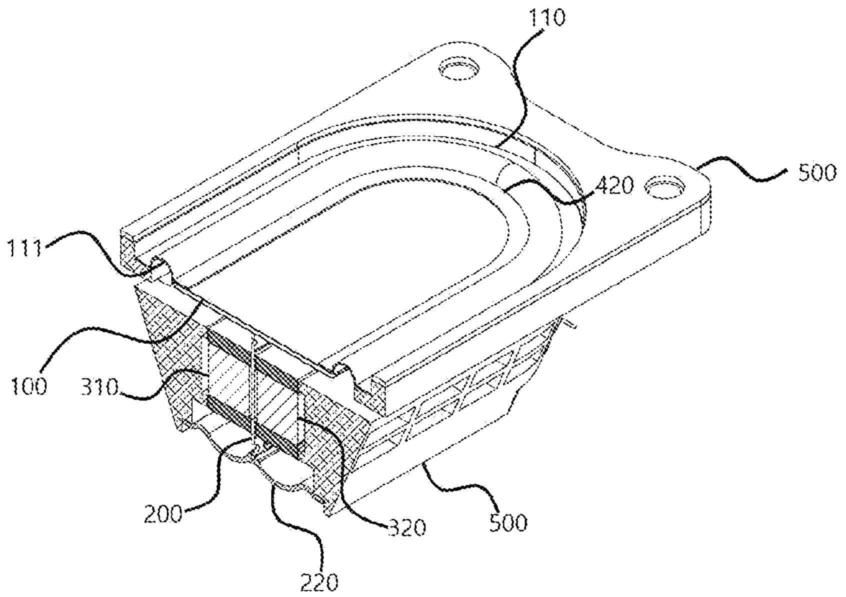
FIG. 1 is a perspective view illustrating a linear speaker of the present disclosure.

A linear speaker of the present disclosure may include a diaphragm vibrating in a vertical direction and extending in a first direction perpendicular to the vertical direction;

a coil substrate having an upper end coupled to a lower surface of the diaphragm and extending in the first direction;

a coil unit printed as a spiral wire on one side surface of the coil substrate parallel to the vertical direction and the first direction;

a first magnet which is magnetically polarized in the vertical direction and located spaced apart from the coil substrate in a second direction perpendicular to the vertical direction and the first direction at a location facing the one side surface of the coil substrate;

a second magnet which is magnetically polarized in the vertical direction and located spaced apart from the coil substrate in the second direction at a location facing the other side surface of the coil substrate; and a plurality of yokes coupled to upper ends and lower ends of the first magnet and the second magnet, respectively.

In the linear speaker of the present disclosure, the plurality of yokes may include a first yoke coupled to the upper end of the first magnet, a second yoke coupled to the lower end of the first magnet, a third yoke coupled to the upper end of the second magnet, and a fourth yoke coupled to the lower end of the second magnet, wherein the first yoke, the second yoke, the third yoke, and the fourth yoke may be formed in a plate shape of a plane perpendicular to the vertical direction, one edge of the first yoke may face and be spaced apart from one edge of the third yoke, and one edge of the second yoke may face and be spaced apart from one edge of the fourth yoke.

In the linear speaker of the present disclosure, the coil unit may include a plurality of first straight wires printed at locations facing the first yoke and the third yoke, and a plurality of second straight wires printed at locations facing the second yoke and the fourth yoke, wherein the plurality of first straight wires may be spaced apart from each other at a predetermined interval in the vertical direction and printed on a first straight area formed on the coil substrate, and the plurality of second straight wires may be spaced apart from each other at a predetermined interval in the vertical direction and printed on a second straight area formed on the coil substrate.

In the linear speaker of the present disclosure, thicknesses of the first yoke and the third yoke may be formed to be 62.5% to 82.5% of a width in the vertical direction of the first straight area, and thicknesses of the second yoke and the fourth yoke may be formed to be 62.5% to 82.5% of a width in the vertical direction of the second straight area.

In the linear speaker of the present disclosure, thicknesses of the first yoke, the second yoke, the third yoke and the fourth yoke may be formed to be 1.5 mm to 5 mm.

In the linear speaker of the present disclosure, the width in the vertical direction of the first straight area and the width in the vertical direction of the second straight area may be the same, and a length of the first magnet or the second magnet in the vertical direction may be formed to be 92.25% to 112.75% of the width in the vertical direction of the first straight area.

In the linear speaker of the present disclosure, the first magnet and the second magnet are made of a neodymium material.

MODES FOR CARRYING OUT THE INVENTION

Hereinafter, embodiments according to the present disclosure will be described in detail with reference to the accompanying drawings. In this process, the size or shape of the components shown in the drawings may be exaggerated for clarity and convenience of explanation. In addition, terms specifically defined in consideration of the configuration and operation of the present disclosure may vary according to the intentions or customs of users and operators. Definitions of these terms should be made based on the content throughout this specification.

In the description of the present disclosure, it should be noted that the orientation or positional relationship indicated by the terms "center", "upper", "lower", "left", "right", "vertical", "horizontal", "inner side", "outer side", "one surface", "other surface" is based on the orientation or positional relationship shown in the drawing or the orientation or positional relationship normally arranged when using the product of the present disclosure, and it is intended only for explanation and brief description of the present disclosure, and is not to be construed as limiting the present disclosure as it does not suggest or imply that the device or element shown must necessarily be configured or operated in a specific orientation with a specific orientation.

Hereinafter, a linear speaker of the present disclosure will be described in detail with reference to FIGS. 1 to 7.

Figure 2:
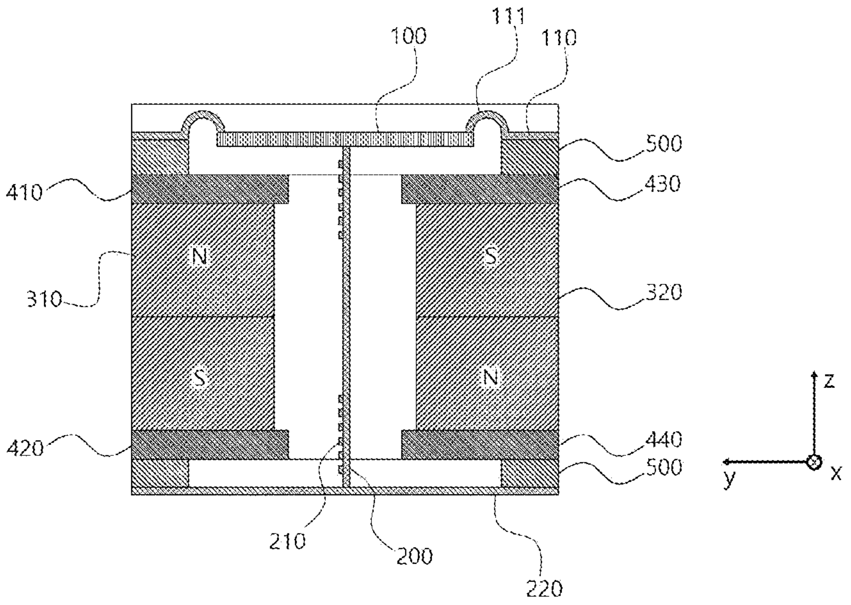
FIG. 2 is a cross-sectional view illustrating a linear speaker of the present disclosure.
Figure 3:
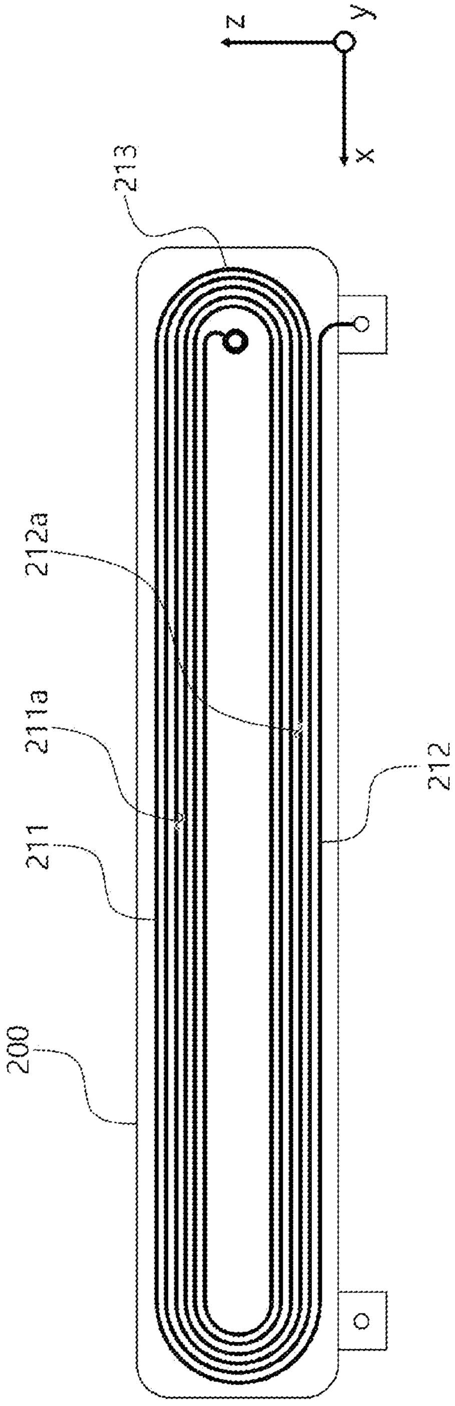
FIG. 3 is a plan view illustrating a coil substrate and a coil unit.

As shown in FIGS. 1 and 2, the linear speaker of the present disclosure may include

- a diaphragm 100 vibrating in a vertical direction and extending in a first direction perpendicular to the vertical direction;
- a coil substrate 200 having an upper end coupled to a lower surface of the diaphragm 100 and extending in the first direction;
- a coil unit 210 printed as a spiral wire on one side surface of the coil substrate 200 parallel to the vertical direction and the first direction;
- a first magnet 310 which is magnetically polarized in the vertical direction and located spaced apart from the coil substrate 200 in a second direction perpendicular to the vertical direction and the first direction at a location facing the one side surface of the coil substrate 200;
- a second magnet 320 which is magnetically polarized in the vertical direction and located spaced apart from the coil substrate 200 in the second direction at a location facing the other side surface of the coil substrate 200; and
- a plurality of yokes coupled to upper ends and lower ends of the first magnet 310 and the second magnet 320, respectively.

In FIGS. 1 to 5, the z-axis direction may be a vertical direction, the x-axis direction may be a first direction, and the y-axis direction may be a second direction.

The linear speaker device of the present disclosure may further include a frame 500, and the diaphragm 100, the first magnet 310, the second magnet 320, and the plurality of yokes may be fixed to the frame 500.

The diaphragm 100 may be provided in the shape of a flat plate perpendicular to the vertical direction.

The diaphragm 100 may be a plate made of a honeycomb material and may be lightweight and have strong bending stress. In addition, the diaphragm 100 made of a honeycomb material may have an advantage in sound straightness. The material of the diaphragm 100 is not limited to a honeycomb material and may be selected in consideration of stiffness and weight.

A flexible fixing means 110 may be connected along the edge of the diaphragm 100, and the diaphragm 100 may be coupled to the frame 500 through the flexible fixing means 110. Accordingly, the diaphragm 100 may be coupled to the frame 500 in a state in which it can move up and down relative to the frame 500. The flexible fixing means 110 may be provided in a closed-loop ring shape in which the edge of the diaphragm 100 may be connected to the inner periphery, and the outer periphery may be connected to the upper surface of the frame 500. The flexible fixing means 110 is formed in a curved surface and may the shape may be changed with little stress. The flexible fixing means 110 may be made of a material such as thermoplastic polyurethane (TPU) or nitrile-butadiene rubber (NBR). The flexible fixing means 110 is not limited to the above-described material, and may be selected in consideration of restoring force and flexibility.

For example, a main convex part 111 may be formed along the rim of the diaphragm 100 toward the upper part of the flexible fixing means 110, and a plurality of auxiliary convex parts may be formed in the main convex part 111. The main convex part 111 and the auxiliary convex part may help the diaphragm 100 to perform smooth repetitive linear motion in the vertical direction by weakening the stress of the flexible fixing means.

The diaphragm 100 may be formed longer in the first direction than in the second direction to form a line-shaped wavefront to generate sound. For example, the diaphragm 100 may be formed to have a length of 20 mm to 150 mm in the first direction and a length of 5 mm to 60 mm in the second direction. For example, the length in the first direction of the diaphragm 100 may be more than twice as long as the length in the second direction.

The coil substrate 200 may have a shape extending in the first direction and having a plane perpendicular to the second direction. The upper end of the coil substrate 200 may be coupled to the lower surface of the diaphragm 100. The lower end of the coil substrate 200 may be coupled to the flexible support unit 220. The coil substrate 200 may be located between the first magnet 310 and the second magnet 320 without contacting the first magnet 310 and the second magnet 320. Specifically, the first magnet 310, the coil substrate 200, and the second magnet 320 may be arranged in the order in the second direction. The length of the coil substrate 200 in the vertical direction may be longer than the lengths of the first magnet 310 and the second magnet 320 in the vertical direction, so that the upper end of the coil substrate 200 protrudes upward more than the upper ends of the first magnet 310 and the second magnet 320, and the lower end of the coil substrate 200 protrudes downward more than the lower ends of the first magnet 310 and the second magnet 320.

The length of the coil substrate 200 in the first direction may also be formed to be longer than the lengths of the first magnet 310 and the second magnet 320 in the first direction. The coil unit 210 of spiral wire formed on the coil substrate 200 may include, along with sections of a first straight wire 211 and a second straight wire 212 extending in the first direction, a curved wire 213 electrically connecting the first straight wire 211 and the second straight wire 212 at both ends of the first straight wire 211 and the second straight wire 212. The length of the coil substrate 200 in the first direction may be longer than the lengths of the first magnet 310 and the second magnet 320 in the first direction so that the curved wire 213 does not face the first magnet 310 and the second magnet 320.

The first magnet 310 and the second magnet 320 may be provided as neodymium magnets, and may be provided in a rectangular parallelepiped shape. Considering the weight of the diaphragm 100 and the coil substrate 200, the elasticity of the flexible fixing means 110 and the support unit in the linear speaker of the present disclosure, it may be preferable that a force of about 20 N or more may be applied to the coil substrate 200 by the magnetic circuit. In addition to the above, considering the current of the coil unit 210 and the specifications of the speaker, the first magnet 310 and the second magnet 320 may be provided as neodymium magnets. For example, the first magnet 310 and the second magnet 320 may be selected from N35, N38, N48, and combinations thereof.

The first magnet 310 and the second magnet 320 may be provided in a rectangular parallelepiped bar shape extending in the first direction. The first magnet 310 and the second magnet 320 may be magnetically polarized in a vertical direction, and specifically, the direction of magnetic polarization of the first magnet 310 and the direction of magnetic polarization of the second magnet 320 may be opposite to each other. For example, when the N pole of the first magnet 310 faces upward and the S pole faces downward, the S pole of the second magnet 320 may face upward and the N pole may face downward. The coil unit 210 may generate force by interacting with the magnetic field formed by the N pole of the first magnet 310 and the S pole of the second magnet 320 and the magnetic field formed by the S pole of the first magnet 310 and the N pole of the second magnet 320. The first magnet 310 and the second magnet 320 may form a magnetic field in the second direction by a plurality of yokes.

Figure 4:
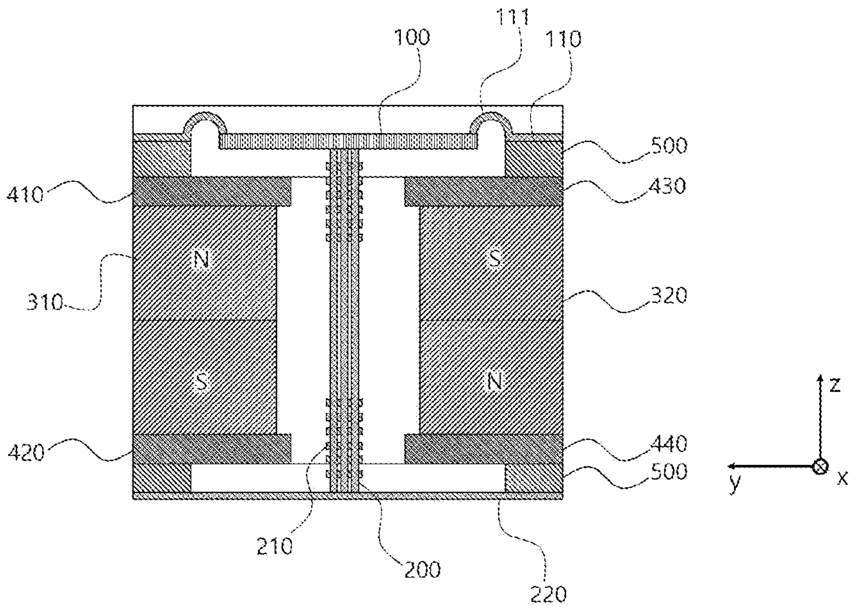
FIG. 4 is a cross-sectional view illustrating another embodiment of a linear speaker of the present disclosure.

As shown in FIG. 4, the coil substrate 200 may provided in plurality and be stacked with each other and the coil unit 210 may also be provided in a plurality and provided on each of the plurality of coil substrates 200.

The plurality of first straight wires 211 may be spaced apart from each other at a predetermined interval in the vertical direction and printed on a first straight area 211*a* formed on the coil substrate 200, and the plurality of second straight wires 212 may be spaced apart from each other at a predetermined interval in the vertical direction and printed on a second straight area 212*a* formed on the coil substrate 200. In the linear speaker of the present disclosure, the coil unit 210 may be formed by printing a metal material on the coil substrate 200. In other words, the coil unit 210 may be formed on a two-dimensional plane perpendicular to the second direction. Accordingly, the wire of the coil unit 210 may be formed in a spirally wound form, surrounding with an increasingly longer circumference and spaced apart from the inner wire, and the plurality of first straight wires 211 may be printed in a state of being spaced apart from each other, and the plurality of second straight wires 212 may also be printed in a state of being spaced apart from each other. Current flow directions in the first straight area 211*a* and current flow directions in the second straight area 212*a* may be opposite to each other.

The plurality of yokes may include a first yoke 410 coupled to the upper end of the first magnet 310, a second yoke 420 coupled to the lower end of the first magnet 310, a third yoke 430 coupled to the upper end of the second magnet 320, and a fourth yoke 440 coupled to the lower end of the second magnet 320.

As shown in FIG. 4, the coil unit 210 may include a plurality of first straight wires 211 printed at locations facing the first yoke 410 and the third yoke 430, and a plurality of second straight wires 212 printed at locations facing the second yoke 420 and the fourth yoke 440.

The first yoke 410, the second yoke 420, the third yoke 430, and the fourth yoke 440 may be formed in a plate shape of a plane perpendicular to the vertical direction, one edge of the first yoke 410 may face and be spaced apart from one edge of the third yoke 430, and one edge of the second yoke 420 may face and be spaced apart from one edge of the fourth yoke 440.

The first yoke 410, the second yoke 420, the third yoke 430 and the fourth yoke 440 may be coupled to the first magnet 310 or the second magnet 320 so as to be closer to the coil substrate 200 than the first magnet 310 or the second magnet 320.

The thicknesses of the first yoke 410, the second yoke 420, the third yoke 430 and the fourth yoke 440 may be formed to be 1.5 mm to 5 mm. The thicknesses of the first yoke 410, the second yoke 420, the third yoke 430 and the fourth yoke 440 may mean sizes in the vertical direction. The degree of thickness of the first yoke 410, the second yoke 420, the third yoke 430 and the fourth yoke 440 may be related to the degree of convergence of a magnetic field formed in the second direction. If the thicknesses of the first yoke 410, the second yoke 420, the third yoke 430, and the fourth yoke 440 are thick, the magnetic field may spread and the force may be dispersed, and if the thicknesses of the first yoke 410, the second yoke 420, the third yoke 430 and the fourth yoke 440 are thin, the average force generated with the coil unit 210 whose location is variable in the vertical direction may be reduced. Therefore, the thicknesses of the first yoke 410, the second yoke 420, the third yoke 430 and the fourth yoke 440 may be preferably formed to be 1.5 mm to 5 mm.

The thicknesses of the first yoke 410 and the third yoke 430 may be formed to be 62.5% to 82.5% of the width in the vertical direction of the first straight area 211*a*, and thicknesses of the second yoke 420 and the fourth yoke 440 may be formed to be 62.5% to 82.5% of the width in the vertical direction of the second straight area 212*a*. As described above, since the plurality of first straight wires 211 or the plurality of second straight wires 212 are printed apart from each other on a two-dimensional plane, the first straight area 211*a* or the second straight area 212*a* may have a certain width in an upward direction. The thickness of the first yoke 410, the second yoke 420, the third yoke 430 and the fourth yoke 440 may be determined by considering the width of the first straight area 211*a* or the second straight area 212*a* in the vertical direction.

The width of the first straight area 211*a* in the vertical direction may mean a distance from the first straight wire 211 located at the uppermost end to the first straight wire 211 located at the lowermost end. The width of the second straight area 212*a* in the vertical direction may mean a distance from the second straight wire 212 located at the uppermost end to the second straight wire 212 located at the lowermost end. The lowermost end of the first straight area 211*a* may be located spaced apart from the uppermost end of the second straight area 212*a* by a predetermined distance.

Figure 5:
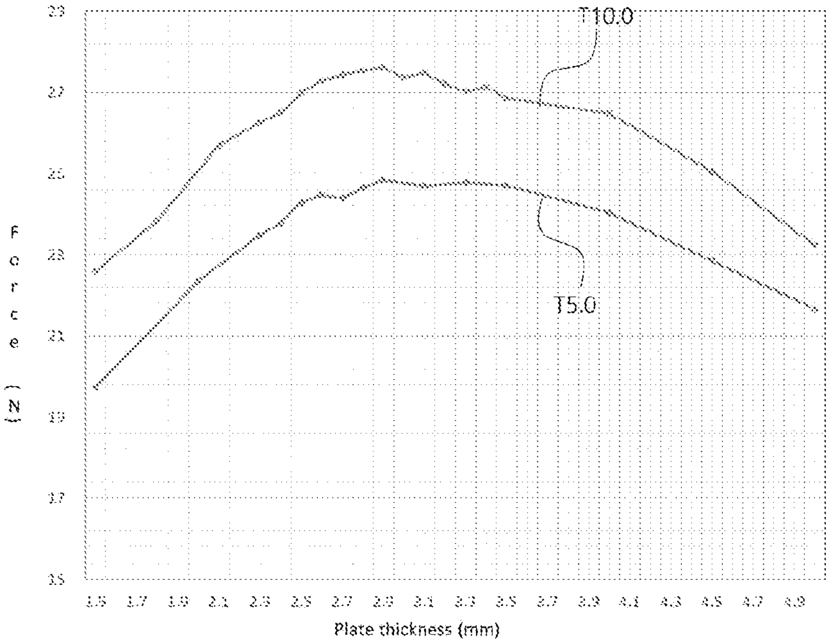
FIG. 5 is a graph illustrating a relationship between thicknesses of a first yoke, a second yoke, a third yoke, and a fourth yoke and a force applied to a coil substrate.

FIG. 5 is a graph illustrating a relationship between thicknesses of a first yoke 410, a second yoke 420, a third yoke 430, and a fourth yoke 440 and a force applied to a coil substrate 200. Specifically, FIG. 5 is a graph showing the force applied to the coil substrate 200 when the current I of Formula 1 is applied based on 10 W to the coil unit 210 in which 21 first straight wires 211 and 21 second straight wires 212 are formed in each of the first straight area 211*a* and the second straight area 212*a* each having a width of 4 mm.

$$I_0 \sin(1000t) \qquad \text{[Formula 1]}$$

$I_0$ refers to an amplitude value of the applied current I, which is 0.3 A. t refers to time, which may be in seconds.

The result of FIG. 5 may be a result value obtained through simulation of the Maxwell mode of the ANSYS Mechanical program. The material of the first magnet 310 and the second magnet 320 is set to neodymium magnet, and the material of the plurality of yokes is set to iron plate. The lengths (thicknesses) of the first magnet 310 and the second magnet 320 in the vertical direction were measured by preparing two sets of T5 and T10, respectively. The force shown in FIG. 6 may be a root mean square (rms) value of the force applied to the coil substrate 200.

Regardless of the lengths of the first magnet 310 and the second magnet 320 in the vertical direction, when the thicknesses of the first yoke 410, the second yoke 420, the third yoke 430 and the fourth yoke 440 are 72.5% of the width of the first straight area 211*a* and the second straight area 212*a* in the vertical direction, the maximum force is exhibited, and a force of more than 90% of the maximum force is exhibited at +10% to −10% with respect to 72.5%. In other words, when the thicknesses of the first yoke 410, the second yoke 420, the third yoke 430 and the fourth yoke 440 range from 62.5% to 82.5% of the widths of the first straight area 211*a* and the second straight area 212*a* in the vertical direction, it shows more than 90% of the maximum force.

The width in the vertical direction of the first straight area 211*a* and the width in the vertical direction of the second straight area 212*a* may be the same, and the length of the first magnet 310 or the second magnet 320 in the vertical direction may be formed to be 92.25% to 112.75% of the width in the vertical direction of the first straight area 211*a*.

Figure 6:
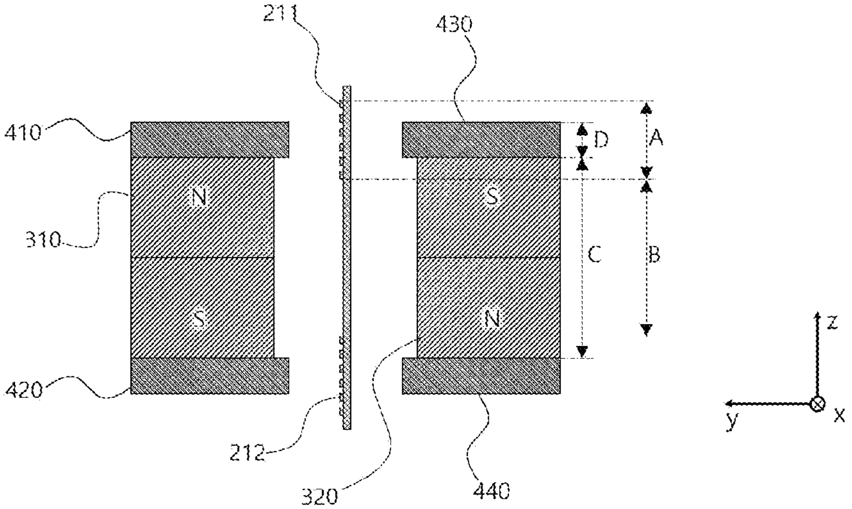
FIG. 6 is a cross-sectional view illustrating a magnetic circuit.

Specifically, as shown in FIG. 6, the separation distance B between the first straight area 211*a* and the second straight area 212*a* may be about 75% of the vertical direction length A of the first straight area 211*a* considering the interference in the magnetic circuit. Assuming that the center of the first yoke 410 or the third yoke 430 coincides with the center of the first straight area 211*a*, the length C of the first magnet 310 or the second magnet 320 in the vertical direction may be expressed by Formula 2 below.

$$C = B + 2\times\left(\frac{A-D}{2}\right) \qquad \text{[Formula 2]}$$

D may be the length of the first yoke 410 or the third yoke 430 in the vertical direction.

As described above, considering that the vertical direction length D of the first yoke 410 or the third yoke 430 shows the maximum efficiency at 72.5% of the vertical direction length A of the first straight are 211*a*, and considering that B is 75% of A, it may be preferable that the vertical direction length C of the first magnet 310 or the second magnet 320 be 102.5% of the vertical direction length A of the first straight area 211*a*. For example, the length of the first magnet 310 or the second magnet 320 in the vertical direction may be formed to be 92.25% to 112.75% of the width in the vertical direction of the first straight area 211*a*.

For example, when the first straight line area 211*a* is about 4 mm, the lengths of the first magnet 310 and the second magnet 320 in the vertical direction may be formed to be 5 mm to 25 mm. The lengths of the first magnet 310 and the second magnet 320 in the vertical direction may be related to the strength of the magnetic field.

Figure 7:
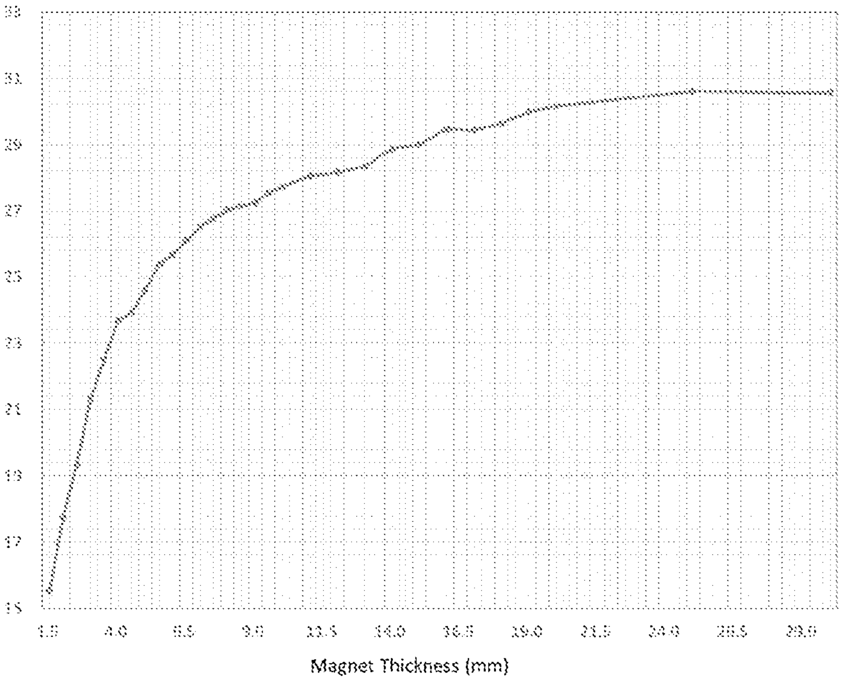
FIG. 7 is a graph illustrating a relationship between lengths of a first magnet and a second magnet in a vertical direction and a force applied to a coil substrate.

FIG. 7 is a graph illustrating a relationship between lengths of a first magnet 310 and a second magnet 320 in a vertical direction and a force applied to a coil substrate 200. Specifically, FIG. 7 is a graph showing the force applied to the coil substrate 200 when the current I of Formula 1 above is applied based on 10 W to the coil unit 210 in which 21 first straight wires 211 and 21 second straight wires 212 are formed in each of the first straight area 211*a* and the second straight area 212*a* each having a width of 4 mm.

The result of FIG. 7 may be a result value obtained through simulation of the Maxwell mode of the ANSYS Mechanical program. The material of the first magnet 310 and the second magnet 320 is set to neodymium magnet, and the material of the plurality of yokes is set to iron plate. The lengths (thicknesses) of the first magnet 310 and the second magnet 320 in the vertical direction were set as T10 and measured respectively. The force shown in FIG. 7 may be a root mean square (rms) value of the force applied to the coil substrate 200.

Referring to FIG. 7, it may be seen that the force applied to the coil substrate 200 reaches and converges to 30 N when the length of the first magnet 310 and the second magnet 320 is 25 mm in the vertical direction, and 24 N corresponding to 80% of the maximum convergence value at 5 mm. Accordingly, it may be preferable that the lengths of the first magnet 310 and the second magnet 320 in the vertical direction are 5 mm to 25 mm.

Although embodiments according to the present disclosure have been described above, they are only illustrative and those skilled in the art will understand that various modifications and embodiments of equivalent range are possible therefrom. Therefore, the true technical protection scope of the present disclosure should be defined by the following claims.

EXPLANATION OF SYMBOLS

100 . . . Diaphragm 110 . . . Flexible fixing means
111 . . . Main convex part 200 . . . Coil substrate
210 . . . Coil unit 211 . . . First straight wire
211*a* . . . First straight area 212 . . . Second straight wire
212*a* . . . Second straight area 213 . . . Curved wire
220 . . . Flexible support unit 310 . . . First magnet
320 . . . Second magnet 410 . . . First yoke
420 . . . Second yoke 430 . . . Third yoke
440 . . . Fourth yoke 500 . . . Frame

INDUSTRIAL APPLICABILITY

For the linear speaker of the present disclosure, the magnetic circuit of the driving unit that drives the diaphragm extending in one direction is optimized, so that the linear speaker may be driven efficiently and stably.

The linear speaker of the present disclosure may minimize the configuration and size of the device by radiating the sound source itself as a line-shaped wavefront, and may effectively propagate sound in a wide space.

The invention claimed is:

1. A linear speaker comprising:

a diaphragm vibrating in a vertical direction and extending in a first direction perpendicular to the vertical direction;

a coil substrate having an upper end coupled to a lower surface of the diaphragm and extending in the first direction;

a coil unit printed as a spiral wire on one side surface of the coil substrate parallel to the vertical direction and the first direction;

a first magnet which is magnetically polarized in the vertical direction and located spaced apart from the coil substrate in a second direction perpendicular to the vertical direction and the first direction at a location facing the one side surface of the coil substrate;

a second magnet which is magnetically polarized in the vertical direction and located spaced apart from the coil substrate in the second direction at a location facing the other side surface of the coil substrate; and a plurality of yokes coupled to upper ends and lower ends of the first magnet and the second magnet, respectively;

wherein the plurality of yokes comprise:

a first yoke coupled to the upper end of the first magnet, a second yoke coupled to the lower end of the first magnet, a third yoke coupled to the upper end of the second magnet, and a fourth yoke coupled to the lower end of the second magnet, and wherein the first yoke, the second yoke, the third yoke, and the fourth yoke are formed in a plate shape of a plane perpendicular to the vertical direction, one edge of the first yoke faces and is spaced apart from one edge of the third yoke, and one edge of the second yoke faces and is spaced apart from one edge of the fourth yoke;

wherein the coil unit comprises:

a plurality of first straight wires printed at locations facing the first yoke and the third yoke, and a plurality of second straight wires printed at locations facing the second yoke and the fourth yoke, and wherein the plurality of first straight wires are spaced apart from each other at a predetermined interval in the vertical direction and printed on a first straight area formed on the coil substrate, and the plurality of second straight wires are spaced apart from each other at a predetermined interval in the vertical direction and printed on a second straight area formed on the coil substrate;

wherein thicknesses of the first yoke, the second yoke, the third yoke, and the fourth yoke are formed to be 1.5 mm to 5 mm;

wherein each of the first straight area and the second straight area has a width in the vertical direction of 4 mm, and a length of the first magnet or the second magnet in the vertical direction is formed to be 92.25% to 112.75% of the width in the vertical direction of the first straight area.

2. The linear speaker of claim 1, wherein thicknesses of the first yoke and the third yoke are formed to be 62.5% to 82.5% of a width in the vertical direction of the first straight area, and thicknesses of the second yoke and the fourth yoke are formed to be 62.5% to 82.5% of a width in the vertical direction of the second straight area.

3. The linear speaker of claim 1, wherein the first magnet and the second magnet are made of a neodymium material.

* * * * *